United States Patent [19]

Sato

[11] Patent Number: 4,729,703

[45] Date of Patent: Mar. 8, 1988

[54] DOUBLE NUT

[75] Inventor: Toshiyuki Sato, Daito, Japan

[73] Assignee: Kabushiki Kaisha Suiken Technology, Osaka, Japan

[21] Appl. No.: 923,599

[22] Filed: Oct. 27, 1986

[30] Foreign Application Priority Data

Nov. 29, 1985 [JP] Japan .................. 60-184635[U]

[51] Int. Cl.⁴ ............................................. F16B 31/00
[52] U.S. Cl. ....................................... 411/5; 411/237; 411/238; 411/433
[58] Field of Search ................ 411/3, 5, 180, 181, 411/237, 239, 222, 242, 238, 432, 433

[56] References Cited

U.S. PATENT DOCUMENTS

| 897,168 | 8/1908 | Smith | 411/222 |
| 1,372,525 | 3/1921 | McCabe | 411/237 |
| 2,285,080 | 6/1942 | Berge | 411/237 |

FOREIGN PATENT DOCUMENTS

| 63234 | 2/1945 | Denmark | 411/239 |
| 743102 | 12/1943 | Fed. Rep. of Germany | 411/239 |
| 711958 | 7/1931 | France | 411/237 |
| 1156859 | 12/1957 | France | 411/237 |
| 2403484 | 5/1979 | France | 411/3 |
| 43-23569 | 10/1968 | Japan . | |
| 50-36123 | 10/1975 | Japan . | |
| 519963 | 4/1940 | United Kingdom | 411/237 |

Primary Examiner—LLoyd A. Gall
Attorney, Agent, or Firm—Birch, Stewart, Kolasch & Birch

[57] ABSTRACT

A double nut comprising a locking nut body having a threaded axial bore, the locking nut body being formed with a recess defined by an annular internal surface and arranged in communication with the axial bore, a tightening nut body having a threaded axial bore coaxial with and corresponding in diameter to the axial bore of the locking nut body, the tightening nut body being formed with an annular axial projection insertable into the recess and having an external surface, at least one of the internal and external surfaces being conical with a diameter decreasing gradually in a direction of insertion of the axial projection into the recess, one of the recess and the axial projection being eccentric with both of the axial bores, and a connecting web adapted to break at a predetermined circumferential shearing force and extending radially to connect the external surface to the internal surface.

6 Claims, 13 Drawing Figures

DOUBLE NUT

BACKGROUND OF THE INVENTION

1. Field of the Invention

This invention relates to a double nut of the type which comprises a tightening nut body for clamping articles such as a pair of plates between itself and an enlarged head of a bolt and a locking nut body for frictionally preventing unexpected loosening of the tightening nut body, and more particularly to such a double nut which is improved to provide an exactly predetermined tightening torque.

2. Description of the Prior Art

In clamping for example a pair of plates having aligned perforations with use of a bolt and a nut, a threaded shank of the bolt is inserted through the perforations, and the nut is screwed on the bolt shank and tightened up properly. Such a clamping technique, however, has a disadvantage of resulting in variations in the clamping or tightening force achieved, often causing excessive or insufficient clamping. Another disadvantage of this technique is unexpected loosening of the nut or bolt during subsequent use of the clamped plates.

The problem of unexpected loosening is eliminated or alleviated by an arrangement which is disclosed in Japanese Utility Model Publication No. 50-36123 and which is illustrated in FIG. 11 of the accompanying drawings for the convenience of explanation.

Referring now to FIG. 11, there is shown a combination of a tightening nut 100 having a threaded axial bore 100a and a locking nut 101 similarly having a threaded axial bore 101a. The tightening nut 100 is formed with a recess 102 defined by a conical internal surface and positioned coaxially with the axial bore 100a. The locking nut 101, on the other hand, is formed with an axial projection 103 having a conical external surface and positioned eccentrically with the axial bore 101a. The axial projection 103 is insertable into the recess 102.

In use, a threaded shank 104a of a bolt 104 having an enlarged head 104b is inserted through aligned perforations 105a of a pair of plates 105 to be clamped, and the tightening nut 100 is screwed onto the bolt shank 104a and tightened up properly so that the plates 105 are clamped together at a certain force between the tightening nut 100 and the bolt head 104. Subsequently, the locking nut 101 is screwed on the bolt shank 104a until the conical external surface of the axial projection 103 comes into frictional and wedging contact with the conical internal surface of the recess 102, so that the tightening nut 100 is frictionally prevented from unexpected loosening.

Because of the eccentricity of the axial projection 103, the wedging contact between the conical external surface of the projection 103 and the conical internal surface of the recess 102 results in occurrence of opposite lateral forces as indicated by arrows X, Y in FIG. 11, whereby the two nuts 100, 101 are laterally pressed against the bolt shank 104a. Naturally, such lateral forces also contributes to the prevention of unexpected loosening of the nuts.

The arrangement of FIG. 11, however, still fails to eliminate a disadvantage of excessively or insufficiently clamping the plates 105, which can result in damaging the plates or unacceptable play among the parts involved. Further, this arrangement provides a new drawback of requiring separate screwing of the two nuts 100, 101, thus reducing operability.

In an attampt to prevent non-uniform clamping and to improve operability, Japanese Patent Publication No. 43-23569 proposes such a double nut as illustrated in FIGS. 12 and 13. More specifically, the double nut comprises a tightening nut body 200 having a threaded axial bore 200a and a locking nut body 201 also having a threaded axial bore 201a and joined to the tightening nut body 200 by means of a thin-walled, axial connecting web 202.

In operation, a threaded shank 203a of a bolt 203 having an enlarged head 203b is inserted through aligned perforations 204a of a pair of plates 204, and the double nut is screwed on the bolt shank 203a and tightened up by a wrench (not shown) engaged with the locking nut body 201. Upon further turning the locking nut 201, the connecting web 202 breaks under a certain circumferential shearing force, so that the locking nut body 200 comes into frictional contact with the tightening nut body 201 at the broken connecting web 202 to prevent unexpected loosening of the double nut. The plates 204 are clamped substantially at a tightening torque at which the connecting web 202 breaks. Thus, by altering the wall thickness of the connecting web 202, it is possible to adjust the tightening torque achieved by the double nut.

In reality, however, because the axial connecting web 202 is subjected to axial compression at the time of breaking under a circumferential shearing force, the web 202 actually breaks at a tightening torque which is higher by about 20 to 30% than theoretically expected from the wall thickness of the web 202. Thus, it is impossible to exactly predetermine a tightening torque at which the web 202 breaks. For this reason such a double nut has never been put to practical use.

SUMMARY OF THE INVENTION

It is, therefore, an object of the present invention to provide a double nut which, while retaining the advantages of the prior art arrangements described hereinbefore, is capable of achieving a predetermined tightening torque with an extremely high precision.

According to the invention, there is provided a double nut comprising a first nut body having a threaded axial bore, the first nut body being formed with a recess defined by an annular internal surface and arranged in communication with the axial bore, a second nut body having a threaded axial bore coaxial with and corresponding in diameter to the axial bore of the first nut body to provide a common axis, the second nut body being formed with an annular axial projection insertable into the recess and having an annular external surface, at least one of the internal surface and the external surface being conical with a diameter decreasing progressively in a direction of insertion of the axial projection into the recess, one of the recess and the axial projection being eccentric relative to the common axis, and a connecting web adapted to break at a predetermined circumferential shearing force and extending in a direction intersecting the common axis to connect the external surface to the internal surface.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
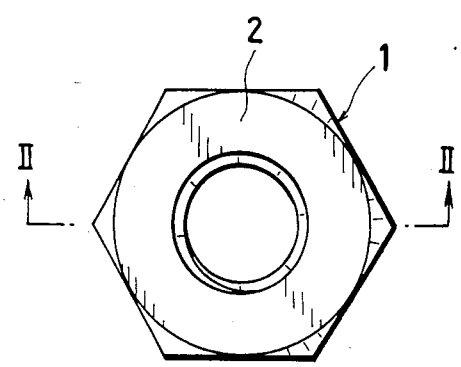
FIG. 1 is a top plan view of a double nut embodying the invention.

Throughout FIGS. 1 to 10 of the accompanying drawings, like parts are designated by the same reference numerals and characters.

Figure 2:
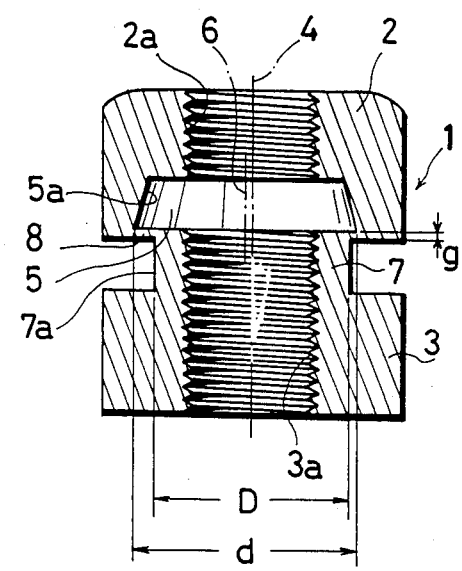
FIG. 2 is a section taken on lines II—II in FIG. 1.

Referring now to FIGS. 1 and 2 of the accompanying drawings, a double nut generally represented by reference numeral 1 comprises a locking nut body 2 and a tightening nut body 3 joined to the locking nut body 2 as hereinafter described. The locking nut body 2 is polygonal, preferably hexagonal, in cross section and formed with a threaded axial bore 2a. Similarly, the tightening nut body 3 is also polygonal, preferably hexagonal, in cross section and formed with a threaded axial bore 3a which is coaxial with and corresponds in diameter to the axial bore 2a of the locking nut body 2. Thus, both of the axial bores 2a, 3a provide a common axis 4.

The locking nut body 2 is also formed with a recess 5 defined by a conical internal surface 5a. The recess 5 communicates with the axial bore 2a but is eccentric therewith to provide an axis 6 which is deviated slightly from the common axis 4.

On the other hand, the tightening nut body 3 is integrally formed with an annular axial projection 7 which has a cylindrical external surface 7a coaxial with the axial bore 3a. The cylindrical surface 7a has a diameter D smaller than a maximum diameter d of the conical surface 5a, so that the axial projection 7 is movable into the recess 5 under a certain condition as described hereinbelow.

The locking nut body 2 and the tightening nut body 3 are joined together by a thin-walled radial connecting web 8 which extends from one end (upper end in FIG. 2) of the cylindrical surface 7a to the maximum diameter end of the conical surface 5a. The connecting web 8 is adapted to break at a predetermined circumferential shearing force. Such a breaking point may be adjusted by selecting a wall thickness g of the connecting web 8.

Figure 3:
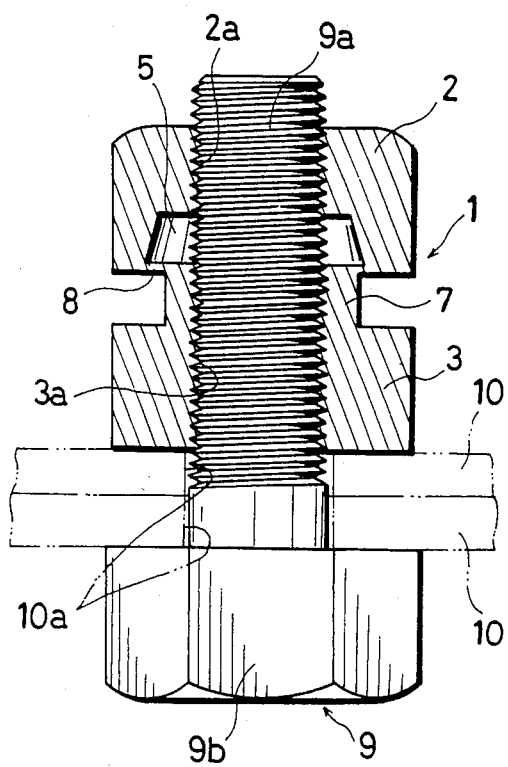
FIG. 3 is a view showing the double nut in central vertical section as used in combination with a bolt for clamping.

In operation, a threaded shank 9a of a bolt 9 having an enlarged head 9b is inserted through aligned perforations 10a of a pair of articles or plates 10 to be clamped. Subsequently, the double nut 1 is screwed on the bolt shank 9a by means of e.g. a wrench (not shown) engaged with the locking nut body 2. As a result, the double nut 1 advances on the bolt shank 9a to clamp the plates 10 between the tightening nut body 3 and the bolt head 9b, as illustrated in FIG. 3.

Figure 4:
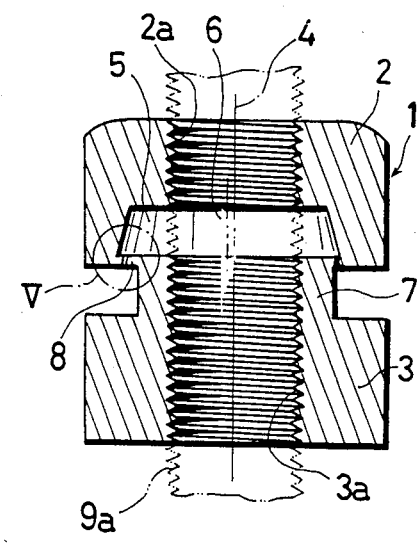
FIG. 4 is a view showing the double nut again in central vertical section in a state in which a connecting web of the double nut has just been broken.
Figure 5:
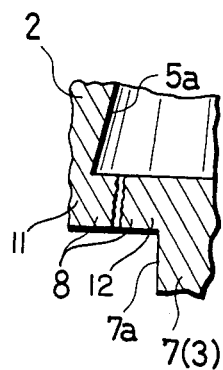
FIG. 5 is an enlarged fragmentary view illustrating a part surrounded by a circle V in FIG. 4.

When the tightening force or torque on the locking nut body 2 of the double nut 1 increases to a predetermined value, the connecting web 8 breaks into broken web portions 11, 12 under a circumferetial shearing force, as illustrated in FIGS. 4 and 5. Because the connecting web 8 extends radially and is thus free of axial compression despite continuous axial advance of the locking nut body 2, the connecting web 8 can shear exactly at the predetermined tightening torque. This prevents the plates 9 from being excessively clamped between the tightening nut body 3 and the bolt head 9b and thereby from being damaged.

Figure 6:
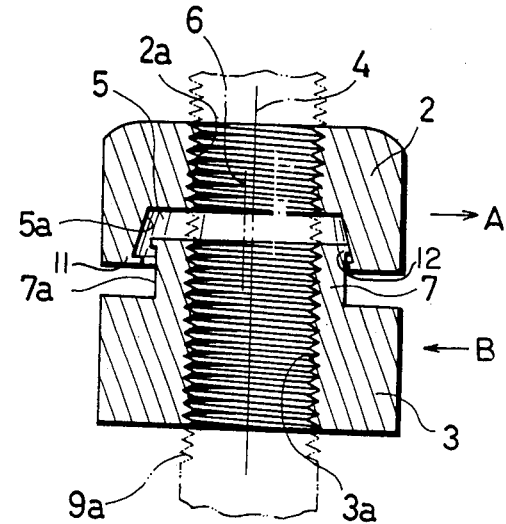
FIG. 6 is a view similar to FIG. 4 but showing the double nut in its final state of clamping.

Upon further turning of the locking nut body 2, the locking nut body 2 advances toward the tightening nut body 3 which has already stopped in its movement, so that that axial projection 7 of the tightening nut body 3 is allowed into the recess 5, as illustrated in FIG. 6. Because the axis 6 of the recess 5 is deviated slightly from the common axis 4 as previously described, the broken web portion 12 of the axial projection 7 comes into wedging contact with the conical surface 5a of the recess 5 only on one side of the common axis 4 in its final state of clamping. Such local wedging contact serves to force the locking and tightening nut bodies 2, 3 against the bolt shank 9a respectively in opposite lateral directions A, B in FIG. 6, thereby firmly anchoring the locking and tightening nut bodies 2, 3 on the bolt shank 9a. Further, a frictional force produced between the locking and tightening nut bodies 2, 3 also contributes significantly in preventing unexpected loosening of the double nut 1.

According to the present invention, the tightening torque at which the connecting web 8 shears can be varied by changing the wall thickness g thereof in accordance with the following equation.

$$g = \frac{M}{K \times \pi \times D^2 \times \tau_a}$$

where
- g: wall thickness of connecting web 8
- M: tightening torque
- K: constant determined by experiment (0.8 in example of FIGS. 1 to 6)
- D: effective diameter (corresponding to outer diameter of axial projection 7 in example of FIGS. 1 to 6)
- $\tau_a$: material strength (2710 kg/cm in example of FIGS. 1 to 6)

Assuming now for example that the effective diameter D is 24.2 mm (the diameter of the threaded axial bores 2a, 3a being 20 mm), the wall thickness g of the connecting web 8 required to achieve a tightening torque M of 1894 kg/cm is calculated as follows.

$$g = \frac{1894}{0.8 \times \pi \times 2.42^2 \times 2710} \approx 0.047 \text{ cm}$$

Assuming similarly that the effective diameter D is 29.1 mm (the diameter of the threaded axial bores 2a, 3a being 24 mm), the wall thickness g of the connecting web 8 necessary to obtain a tightening torque M of 2965 kg/cm is calculated as follows.

$$g = \frac{2965}{0.8 \times \pi \times 2.42^2 \times 2710} \approx 0.05 \text{ cm}$$

Figure 7:
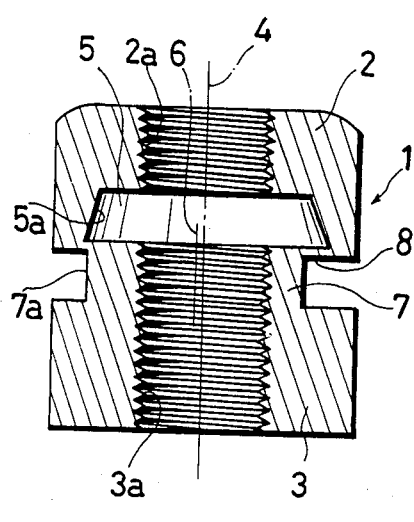
FIGS. 7 to 10 are views similar to FIG. 2 but showing various modifications of the invention.

In the illustrated example of FIGS. 1 to 6, the recess 5 or the conical surface 5a defining it is eccentric relative to the common axis 4, while the axial projection 7 or the cylindrical surface 7a thereof is concentric relative to the common axis 4. However, as shown in FIG. 7, the conical surface 5a of the recess 5 may be concentric relative to the common axis 4, whereas the cylindrical surface 7a of the axial projection 7 is eccentric relative to the common axis. Naturally, such a modification will not result in any reduction in the advantages of the invention.

Figure 8:
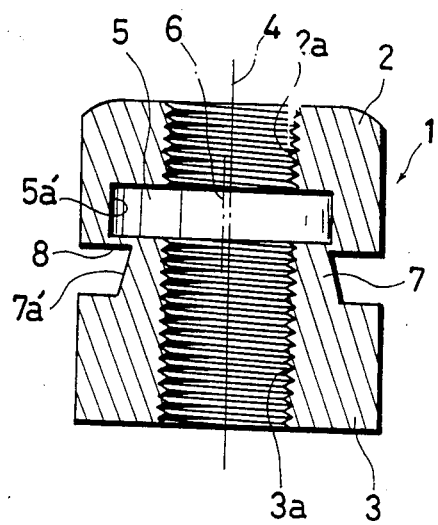

In another modification illustrated in FIG. 8, the recess 5 is defined by a cylindrical internal surface 5a' which provides an axis 6 slightly deviated from the common axis 4. The axial projection 7, on the other hand, has a conical external surface 7a' which is coaxial relative to the common axis 4 and which provides a diameter progressively decreasing toward the locking nut body 2.

Figure 9:
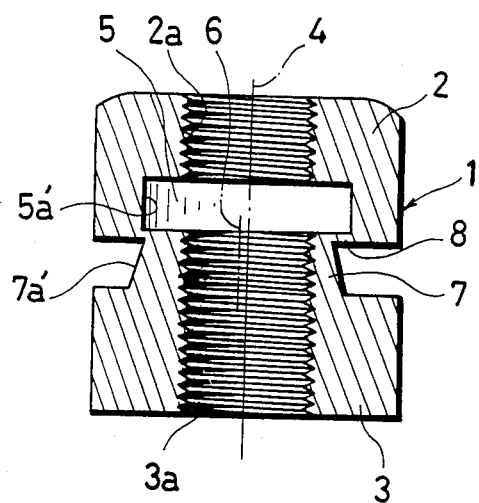

FIG. 9 represents a still another modification which is quite similar to the example of FIG. 8 but differs therefrom in that the cylindrical surface 5a' of the recess 5 is positioned coaxially relative to the common axis 4, whereas the conical surface 7a' of the axial projection 7 has an axis 6 slightly deviated from the common axis 4.

Figure 10:
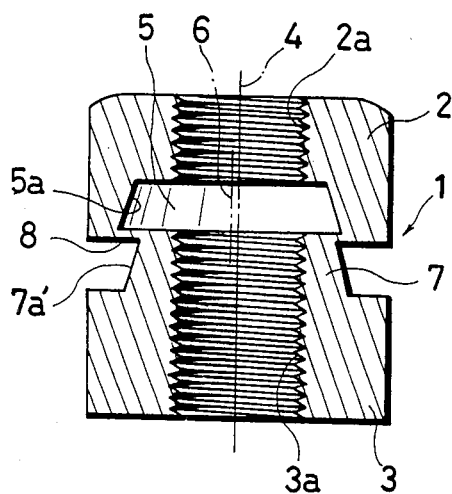
Figure 11:
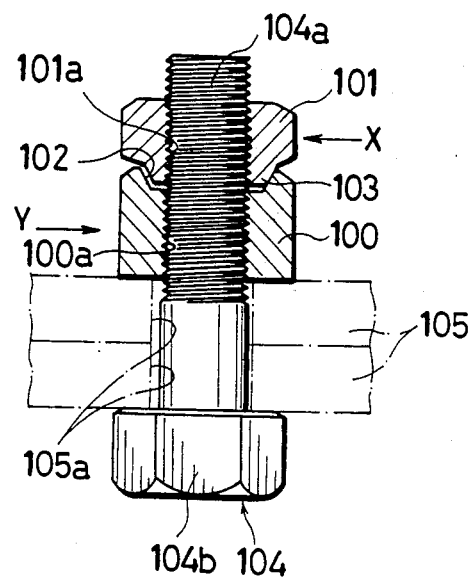
FIG. 11 is a view, in central vertical section, of a pair of conventional nuts as used in combination with a bolt for clamping.
Figure 12:
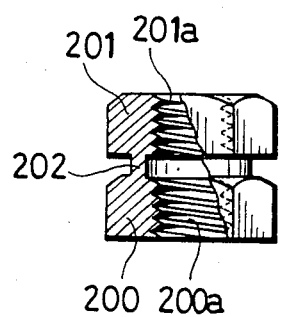
FIG. 12 is a front elevation, partly broken away, of a conventional double nut.
Figure 13:
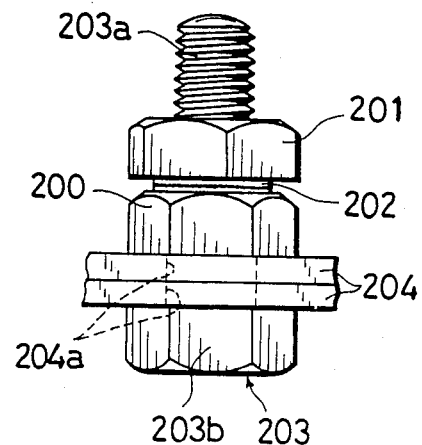
FIG. 13 is a front elevation showing the conventional double nut as used in combination with a bolt for clamping.

In a still another modification shown in FIG. 10, the recess 5 is defined by a conical internal surface 5a flaring toward the tightening nut body 3 and positioned eccentrically with respect to the common axis 4. The axial projection 7 also has a conical external surface 7a' which is concentric with respect to the common axis 4. Though not illustrated, the conical surface 5a of the recess 5 may of course be concentric with the common axis 4, while the conical surface 7a' of the axial projection 7 may be eccentric therewith.

The invention being thus described, it will be obvious that the same may be modified variously in other ways than those already described. For instance, the connecting web 8 may not necessarily extend radially but may extend in any intersecting direction relative to the common axis 4, although the radially extending connecting web 8 is most advantageous in eliminating influences attendant with axial movement of the locking nut body 2 relative to the tightening nut body 3. Further, instead of the illustrated recess 5, the locking nut body 2 may comprise an annular axial projection (not shown) which is adapted to advance into a recess (not shown) formed in the tightening nut body 3. Such variations are not to be regarded as departure from the spirit and scope of the invention, and all such modifications as would be obvious to those skilled in the art are intended to be included within the scope of the appended claims.

I claim:

1. A double nut comprising:
   a first nut body having a threaded axial bore, said first nut body being formed with a recess defined by an annular internal surface and arranged in communication with said axial bore;
   a second nut body having a threaded axial bore coaxial with and corresponding in diameter to said axial bore of said first nut body to provide a common axis,
   said second nut body being formed with an annular axial projection insertable into said recess and having an annular external surface;
   at least one of said internal surface and said external surface being conical with a diameter decreasing progressively in a direction of insertion of said axial projection into said recess;
   one of said recess and said axial projection being eccentric relative to said common axis; and
   a frangible connecting web breakable at a predetermined circumferential shearing force producing a broken web portion extending in a direction intersecting said common axis to connect said external surface to said internal surface,
   wherein a portion of the axial projection is axially spaced from the recess and substantially only said broken web portion engages with said conical surface for providing local wedging contact when securely locking the double nut onto a threaded bolt shank.

2. The double nut as defined in claim 1, wherein said internal surface of said recess is conical and eccentric relative to said common axis, and said external surface of said axial projection is cylindrical and coaxial relative to said common axis.

3. The double nut as defined in claim 1, wherein said internal surface of said recess is conical and coaxial relative to said common axis, and said external surface of said axial projection is cylindrical and eccentric relative to said common axis.

4. The double nut as defined in claim 1, wherein said internal surface of said recess is cylindrical and eccentric relative to said common axis, and said external surface of said axial projection is conical and coaxial relative to said common axis.

5. The double nut as defined in claim 1, wherein said internal surface of said recess is cylindrical and coaxial relative to said common axis, and said external surface of said axial projection is conical and eccentric relative to said common axis.

6. The double nut as defined in claim 1, wherein said internal surface of said recess and said external surface of said axial projection are conical, and one of said internal surface and said external surface is eccentric relative to said common axis, while the other of said internal surface and said external surface is coaxial relative to said common axis.

* * * * *